United States Patent Office 3,062,723
Patented Nov. 6, 1962

3,062,723
PROCESS FOR PRODUCING VITAMIN $B_{12}$
Reuven Dobry and Earl M. Butterworth, Bakersfield, and Roland Jang, Wasco, Calif., assignors to Olin Mathieson Chemical Corporation, New York, N.Y., a corporation of Virginia
No Drawing. Filed Aug. 3, 1960, Ser. No. 47,130
5 Claims. (Cl. 195—114)

This invention relates to a process for preparing vitamin $B_{12}$ (cyanocobalamin) and more particularly to an improved process for converting the LLD active components in a fermentation broth to vitamin $B_{12}$.

Prior to this invention numerous methods were known for preparing and recovering vitamin $B_{12}$. Unfortunately these previously known processes suffered the disadvantages of producing recoverable vitamin $B_{12}$ in relatively low yield and/or high impurity. By the process of this invention, however, vitamin $B_{12}$ is obtained in both high yield and purity.

In essence, the process of this invention comprises culturing a vitamin $B_{12}$ producing strain of microorganism in a cobalt containing nutrient medium deficient in cyanide ions, extracting the LLD active components from the medium, treating the extract with a particulate cation exchanger, whereby the LLD active components are adsorbed on the exchanger, eluting said components from the exchanger, and treating the eluate simultaneously with a source of cyanide ions and light to convert the LLD active components to vitamin $B_{12}$. (By LLD active components are meant substances which give a positive result when tested by the assay procedure described in U.S. Patent No. 2,703,302.)

Any microorganism which produces vitamin $B_{12}$ (when cultured in a nutrient medium containing cobalt and cyanide ions) can be used in the process of this invention. Such microorganism include Streptomyces, such as *Streptomyces griseus*, *Streptomyces aureofaciens*, *Streptomyces albidoflavus*, *Streptomyces antibioticus*, *Streptomyces colombiensis*, *Streptomyces fradiae*, *Streptomyces roseochromogenus* and *Streptomyces olivaceus*; Aerobacter, such as *Aerobacter aerogenes*; Ashbya, such as *Ashbya gossypii*; Mycobacterium, such as *Mycobacterium phlei*, *Mycobacterium smegmatis* and *Mycobacterium tuberculosis*; and preferably Propionibacterium, such as *Propionibacterium freudenreichii*.

As a nutrient medium there is employed the usual sources of assimilable carbon, nitrogen and cobalt. As sources of assimilable carbon, there may be used: (1) carbohydrates, such as glucose, fructose, sucrose, maltose, dextrins and soluble starches; (2) substances containing carbohydrates, such as corn steep liquor and grain mashes; (3) polyhydric alcohols, such as glycerol; (4) fats, such as lard oil, soybean oil, linseed oil, cottonseed oil, peanut oil, coconut oil, corn oil, castor oil, sesame oil, palm oil, mutton tallow; sperm oil, olive oil, tristearin, triolein and tripalmitin; and (5) long chain fatty acids such as stearic acid, palmitic acid, oleic acid, linoleic acid and myristic acid.

Sources of available nitrogen include: (1) organic nitrogen compounds, such as proteinaceous materials, e.g., soybean meal, fish meal, casein, whey or whey concentrates, yeast, amino acids and liver cake; and (2) inorganic compounds, such as nitrates or ammonium compounds.

Assimilable cobalt may be supplied to the nutrient medium in a variety of forms. It may be provided in the form of cobalt salts, such as cobalt chloride or cobalt nitrate; or it may be provided in the form of organically-bound cobalt, such as a cobalt-containing yeast, preferably one containing a relatively high proportion of cobalt (i.e., about 100 or more parts per million); or it may be naturally present in one of the sources of carbon or nitrogen, such as beet molasses.

The nutrient medium may, of course, contain any of the additional components usually found in such solutions (except a source of cyanide ions). Among these additional components are antifoam agents (e.g., lard oil and octadecanol), metallic cations, such as potassium, calcium, magnesium and iron (which may be present in the crude materials used in the nutrient medium), and phosphates (which may be added as inorganic phosphate).

The fermentation process may be carried out at any normal temperature, such as one from about 20° C. to about 40° C. If the microorganism is one which grows under aerobic conditions, a source of oxygen or air should also be present. This aeration can be accomplished by bubbling air (or oxygen) through the medium during the fermentation period or by agitating the medium, thereby exposing a large surface thereof to the atmosphere. If the microorganism is anaerobic in nature, the aeration step is omitted. However, in some instances an aeration step towards the end or after the fermentation period has proven to be beneficial.

After a sufficient incubation time (about one to ten days), the LLD active components in the fermentation broth are recovered. This recovery may be accomplished in a number of ways known to the art. Preferably this recovery is achieved by separating the cells by centrifugation or filtration and then rupturing the cells by heat treatment, acid treatment, and/or slurrying in 50% aqueous acetone. The thus released LLD active components are separated from the ruptured cells by extraction into an aqueous medium. To rupture the cells, steam may be added to the suspension of the separated cells to raise the temperature to about 70° C. The aqueous extract contains the LLD active components, a portion of which is in the form of hydroxocobalamin. In addition, some of the LLD activity is present in forms other than hydroxocobalamin and it is in the conversion of these active by-products to vitamin $B_{12}$ that the process of this invention is advantageous over any previously known process in the art.

The extract is then acidified, if necessary, to a pH in the range of about 2 to about 6 (preferably about 2 to about 3) by treatment with an acid, such as a mineral acid as exemplified by hydrochloric and sulfuric acid and the acidified extract is then treated with a particulate cation exchanger, preferably at a temperature of about 20° C. to about 40° C.

Suitable cation exchangers for use in the process of this invention include those cation exchangers, especially cation exchange resins, particularly of the carboxylic acid type, priorly used for the adsorption of streptomycin and other basic antibiotics. Examples of such resins are those described in the following U.S. Patents: 2,319,359; 2,333,754; 2,340,110; and 2,340,111. Particularly preferred are methacrylate carboxylic resins, such as those sold under the trademarks: Amberlite IRC–50 and Amberlite XE–89.

The treatment of the extract with the cation exchanger may be carried out either batchwise or continuously, using one or more cation exchange columns, tanks or other vessels. Cation exchange columns are preferred, however, because of their efficiency, ease of operation and compactness. The extract is passed, preferably downflow, through the cation exchanger, in its hydrogen form, until substantially all of the LLD active components are adsorbed on the exchanger. One column may be used or a plurality of columns connected in series can be employed to assure complete adsorption of the active material.

The active material is then eluted from the exchanger by treatment with a basic material. Preferably an inorganic basic material is used, such as an aqueous solution of an alkali metal hydroxide (e.g., sodium hydroxide) or ammonia. Particularly preferred, however, are salts of strong bases and weak acids, such as an alkali metal carbonate (e.g., sodium carbonate and sodium bicarbonate) since these reagents give a low or a negative heat of reaction thereby minimizing the chance of destruction of the active materials during elution from the resin. The elution may be carried out continuously in the columns themselves, if such are used, or batchwise by dumping the contents of the columns in tanks and adding the basic material to the tanks.

Elution is continued until the eluate is at a basic pH, preferably about 7 to about 10, thereby assuring substantially complete removal of the active materials from the exchanger. If desired, the exchanger can then be washed with water and the wash combined with the eluate.

The eluate is then treated with light and a source of cyanide ions. As used in this specification the term "light" means electromagnetic waves of wavelength of about 3600 to about 8000 Angstroms. As a practical matter, the illumination may be supplied by use of white fluorescent bulbs. Although any source of cyanide ions may be used and thus hydrogen cyanide itself is not excluded, the preferred sources of cyanide are the alkali metal salts, such as potassium cyanide. Since this cyanide treatment is conducted under basic conditions the hazard due to hydrogen cyanide fumes is thereby minimized. The cyanide may be added before the irradiation step or may be, and preferably is, added intermittently during said step. The irradiation and cyaniding step takes from about 2 to about 30 hours and results not only in the conversion of the hydroxocobalamin to vitamin $B_{12}$ but also in the conversion of various LLD active by-products to the desired vitamin $B_{12}$.

The resulting vitamin $B_{12}$ containing solution is then treated in the usual way to recover the vitamin $B_{12}$ therein. One such method entails the extraction of the vitamin $B_{12}$ into an organic solvent (e.g., a phenol-benzene solvent) in the manner known to those skilled in the art.

The following examples illustrate the invention (all temperatures being in centigrade):

EXAMPLE 1

(a) *Fermentation.*—A sterile aqueous medium consisting of 7.6% beet molasses, 1.5% yeast autolysate solids, 1.0% corn steep liquor, and 2.0% $CaCO_3$, contained in a stainless steel fermentation vessel, is inoculated with an active culture of *Propionibacterium freudenreichii*. Following a four day fermentation period at 30° (pH controlled at pH 7.0–8.0 with sodium hydroxide), the bacterial cells are harvested by centrifugation.

(b) *Extraction.*—The LLD active components are released from the bacterial cells by heating the cell cream to 82° for 30 minutes. The heated cells are washed thoroughly with water to remove all LLD active components and the resulting solution is concentrated in vacuo. In this manner, 6 liters of concentrate containing 1,500 mgs. of LLD active substances are prepared.

(c) *Adsorption.*—Two liters of concentrate obtained in step *b* are acidified to pH 2.6 by addition of $H_2SO_4$, and filtered to remove insoluble matter. A chromatographic column, 600 x 40 mm., is packed with wet Amberlite IRC–50 resin in its hydrogen form to a height of 22 inches. Filtered concentrate is passed downward through the column at a rate of 25 ml./min., followed by a rinse with tap water acidified to pH 2 with sulfuric acid. Both effluent concentrate and wash are virtually free of LLD active matter.

(d) *Elution.*—The washed resin is dumped into a 2 liter beaker, slurried with a minimum of tap water and treated with 650 ml. of 5 N sodium carbonate. This corresponds roughly to a dosage of 11 meq. $Na_2CO_3$ per gm. of resin, just enough to convert resin to the sodium form. The reagent is added slowly with ample mixing, to minimize foaming caused by evolution of $CO_2$. Slow stirring is continued for several hours until the desorption process is complete. The resin is separated by filtration and rinsed with water. The combined filtrate contains substantially all of the LLD active substances originally present in the concentrate.

(e) *Irradiation and cyaniding.*—An aliquot of the column eluate is adjusted to pH 7 with $H_2SO_4$ then placed in a shallow, white enamel pan at a depth of ½". Following the addition of 10 mg. percent cyanide (as KCN) the tray is illuminated with a 100 watt incandescent bulb (held 3 inches above the liquid surface) for 8 hours.

(f) *Recovery.*—Analysis of the illuminated concentrate shows an LLD loss of only 2.1%. The purity of the material as cyanocobalamin is 32.6% following salt removal with phenol-benzene.

EXAMPLE 2

(a) *Fermentation.*—An active culture of *P. freudenreichii* is used to inoculate a heat sterilized aqueous medium containing 2% yeast autolysate solids, 1.0% corn steep liquor, 7.6% beet molasses, 1.0% Staleys Sauce No. 3 (a soy sauce), 5 p.p.m. cobalt (as cobalt sulfate) and 2% $CaCO_3$. A pH of 6.0–6.5 is maintained by NaOH additions throughout a five day fermentation period at a temperature of 32°. The progress of the fermentation is followed by periodic tests for residual sugar and contamination is checked by conventional plating methods.

(b) *Extraction.*—At the conclusion of the fermentation, the bacterial cells are extracted with an equal volume of acetone at room temperature for 30 minutes. The 50% acetone extract, which contains the LLD active compounds, is flash evaporated to ⅙ of its original volume.

(c) *Adsorption.*—The crude cobalamin solution contains about 35 mg. LLD active material per liter. Thirty-six liters of this solution are acidified to pH 2.45 with sulfuric acid, filtered, and passed at the rate of 90 ml./min. through 3 columns of Amberlite IRC–50 resin in its hydrogen form, the columns being as described in Example 1c and arranged in series. Fifty liters of effluent, including a 14 liter rinse with acidified tap water, contain less than 0.5% of the LLD activity.

(d) *Elution.*—The contents of each column are dumped into separate containers, slurried with water and aqua ammonia is added slowly until the pH remains steady at 9. The eluates of column 1, 2 and 3 contain 75, 22 and 2% of the original LLD active matter, respectively.

(e) *Irradiation and cyaniding.*—The combined column eluates are illuminated at pH 9, the illumination being provided by a 100 watt incandescent lamp suspended 4 inches above the surface of the eluate which is held in a white enamel tray at a depth of ½ inch. Ten mg. percent cyanide (as KCN) are added before illuminating for a 30 hour period. Water is added to make up evaporation losses.

(f) *Recovery.*—Analysis shows that 3.36% of the original LLD activity is lost during the illumination, and 96.4% is completely converted to cyanocobalamin. The purity of the resulting cyanocobalamin is 29.3% after inorganic salts are removed by a phenol-benzene extraction cycle.

The sequence in which the adsorption on the cation exchanger, irradiation and cyaniding are conducted is critical. If an attempt is made to alter the order of these steps, the amount and purity of recoverable vitamin $B_{12}$ are decreased.

The criticality of the order of these steps is shown by the following comparative tests.

Test I 1000 ml. of the concentrate obtained in step (b) of Example 1 was adjusted to pH 3 with sulfuric acid and to the acidified solution was added 50 g. of Amberlite IRC-50 resin in its hydrogen form. After five hours, the effluent was filtered from the resin and to the resin was added slowly, with stirring, 2 N sodium carbonate until an amount equal to 10 milliequivalents of sodium carbonate per dry gram of resin had been added. After an agitation period of four hours at room temperature, the mixture was filtered and the resin was washed with several small volumes of water. The eluate and washes were combined and the pH adjusted to 7.5 with sulfuric acid. Water is added to give a final volume of 1000 ml. of solution and the solution was then placed in a white enamel pan to a depth of one inch. 35 mg. of buffered potassium cyanide was added and the solution was illuminated for eighteen hours with two standard cool white fluorescent bulbs (15 watts each) placed six inches above the liquid surface. Following illumination, an additional 35 mg. of buffered potassium cyanide was added. The resulting vitamin $B_{12}$ and LLD active components after each key step is shown in the following table.

Test II

The same procedure as used in Test I was employed, except that no potassium cyanide was added until after completion of the illumination period and then 70 mg. of buffered potassium cyanide was added. The resulting vitamin $B_{12}$ and LLD active components after each key step is shown in the following table.

Test III 1000 ml. of the concentrate obtained in step (b) of Example 1 was placed, to a depth of one inch, in a white enamel tray. The solution was illuminated for eighteen hours with two standard cool white fluorescent bulbs (15 watts each) placed six inches above the liquid surface. After the illumination period, 70 mg. of buffered potassium cyanide was added and the mixture was then acidified to pH 3 with sulfuric acid and to the acidified solution was added 50 g. of Amberlite IRC-50 resin in its hydrogen form. After six hours, the effluent is filtered from the resin and to the resin is added slowly, with stirring, 2 N sodium carbonate until an amount equal to 10 milliequivalents of sodium carbonate per dry gram of resin had been added. After an agitation period of four hours at room temperature, the mixture was filtered and the resin was washed with several small volumes of water. The eluate and washes were combined. The resulting vitamin $B_{12}$ and LLD active components after each key step is shown in the following table.

Test IV 1000 ml. of the concentrate obtained in step (b) of Example 1 was placed, to a depth of one inch, in a white enamel tray. 35 mg. of buffered potassium cyanide was added and the solution was illuminated for eighteen hours with two standard cool white fluorescent bulbs (15 watts each) placed 6 inches above the liquid surface. Following illumination, an additional 35 mg. of buffered potassium cyanide was added. The resulting solution was then acidified to pH 3 with sulfuric acid and treated with Amberlite IRC-50 resin as described in Test III. The resulting vitamin $B_{12}$ and LLD active components after each key step is shown in the following table.

In each instance the final solution was put through a phenolbenzene extraction and then into water to remove inorganic salts.

TABLE

| | Test I | | Test II | | Test III | | Test IV | |
|---|---|---|---|---|---|---|---|---|
| | mg. | Percent | mg. | Percent | mg. | Percent | mg. | Percent |
| Starting LLD activity | 250 | 100 | 250 | 100 | 250 | 100 | 250 | 100 |
| IRC-50 Eluate—LLD activity | 227 | 90.6 | 227 | 90.6 | 212 | 84.6 | 226 | 90.4 |
| IRC-50 Effluent—LLD activity | 23 | 9.4 | 23 | 9.4 | 27 | 11.4 | 24 | 9.6 |
| Cyanide and Light Treated—LLD activity | 227 | 90.6 | 211 | 84.1 | 239 | 95.7 | 250 | 100 |
| Illumination Loss—LLD activity | 0 | 0 | 16 | 7.1 | 11 | 4.4 | 0 | 0 |
| Overall Loss—LLD activity | 23 | 9.4 | 39 | 15.5 | 38 | 15.8 | 24 | 9.6 |
| Final Percent Vitamin $B_{12}$ | | 100 | | 100 | | 85 | | 85 |
| Final Percent Other LLD activity | | 0 | | 0 | | 15 | | 15 |
| Purity of Final Vitamin $B_{12}$ | | 35.5 | | 27.5 | | 24.2 | | 25.2 |

From the above table it can be seen that the process of this invention (the procedure of Test I) yields a vitamin $B_{12}$ product of higher purity and in higher yield than any process involving a modification in the sequence of steps.

The invention may be variously otherwise embodied within the scope of the appended claims.

What is claimed is:

1. A process for preparing vitamin $B_{12}$ which comprises culturing a vitamin $B_{12}$ producing strain of microorganism in a cobalt containing nutrient medium deficient in cyanide ions, extracting the LLD active components from the medium, treating the extract with a cation exchange resin in its hydrogen form, whereby the LLD active components are adsorbed on the exchanger, eluting said components from the exchanger until the eluate is at a basic pH, and treating the eluate simultaneously for a period of from about 2 to about 30 hours with a source of cyanide ions and light having a wavelength of from about 3600 A. to about 8000 A. to convert the LLD active components to vitamin $B_{12}$.

2. The process of claim 1 wherein the exchanger is a methacrylic carboxylic acid cation exchange resin.

3. A process for preparing vitamin $B_{12}$ which comprises culturing *Propionibacterium freudenreichii* in a cobalt containing nutrient medium deficient in cyanide ions, separating the LLD active components from the resulting *Propionibacterium freudenreichii* cells into an aqueous medium, treating said aqueous medium with a cation exchanger resin in its hydrogen form to adsorb the LLD active components thereon, eluting said components from said resin until the eluate is at a basic pH, and treating the eluate simultaneously for a period of from about 2 to about 30 hours with an inorganic cyanide salt and light having a wavelength of from about 3600 A. to about 8000 A. to convert said components to vitamin $B_{12}$.

4. The process of claim 3 wherein the resin is a methacrylic carboxylic acid resin.

5. The process of claim 4 wherein the inorganic cyanide salt is potassium cyanide.

References Cited in the file of this patent

UNITED STATES PATENTS

| 2,530,416 | Wolf | Nov. 21, 1950 |
| 2,694,679 | Holland et al. | Nov. 16, 1954 |
| 2,886,490 | Marco | May 12, 1959 |

OTHER REFERENCES

Colman et al.: "Ion Exchangers in Organic and Biochemistry," Interscience Pub. Inc., New York, N.Y., p. 527, 1957.